Feb. 26, 1929.  A. C. BURRAGE  1,703,388
METHOD FOR THE PRESENTATION OF MAXIMUM OF
SUNLIGHT TO THE PLANTS IN GREENHOUSES
Filed Nov. 12, 1926   4 Sheets-Sheet 1

Inventor
Albert C. Burrage
by Roberts Cushman & Woodbury
Att'ys

Feb. 26, 1929. 1,703,388

A. C. BURRAGE
METHOD FOR THE PRESENTATION OF MAXIMUM OF
SUNLIGHT TO THE PLANTS IN GREENHOUSES
Filed Nov. 12, 1926  4 Sheets-Sheet 2

Inventor
Albert C. Burrage
by Roberts Cushman & Woodbury
Att'ys

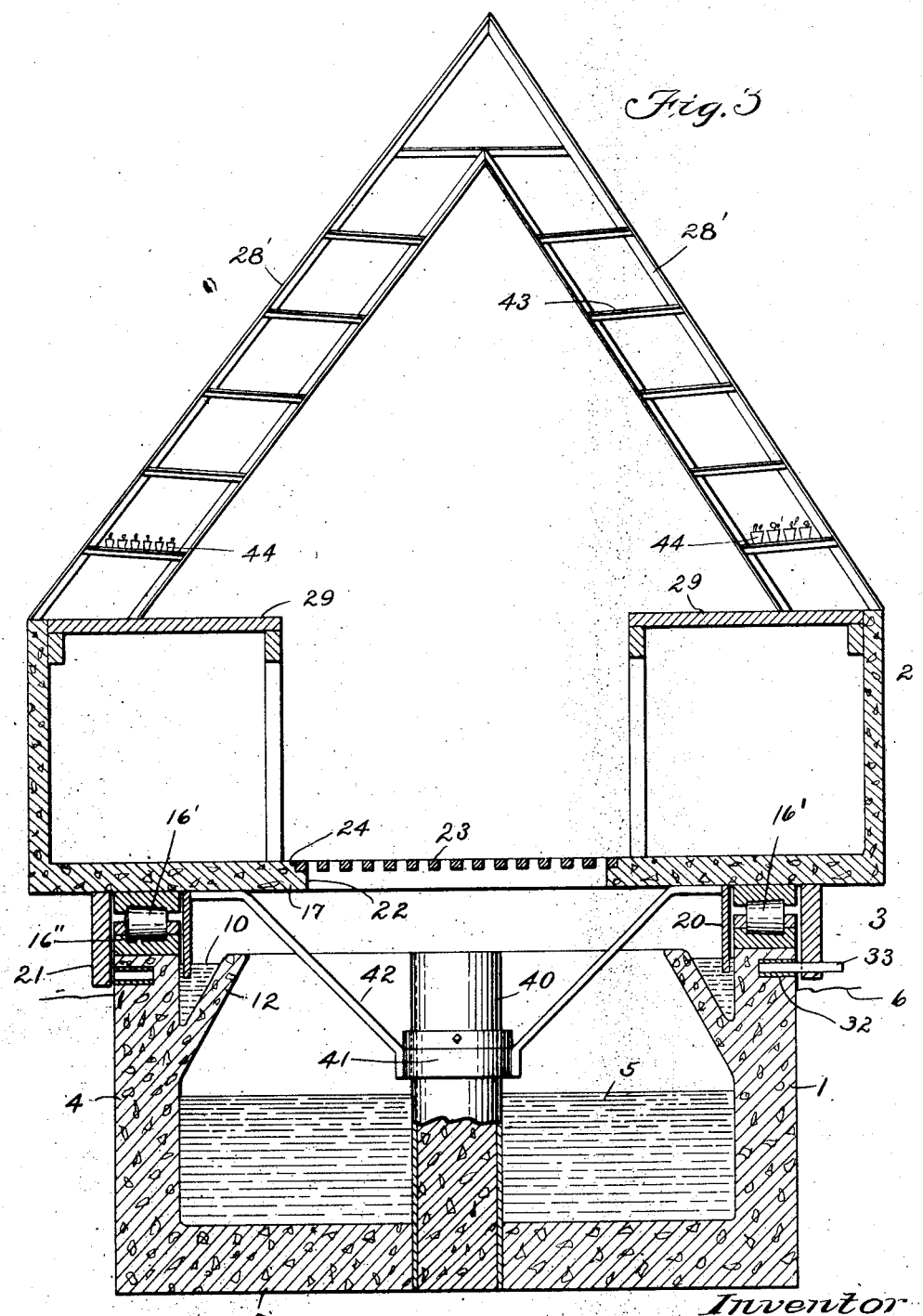

Feb. 26, 1929.
A. C. BURRAGE
METHOD FOR THE PRESENTATION OF MAXIMUM OF
SUNLIGHT TO THE PLANTS IN GREENHOUSES
Filed Nov. 12, 1926
1,703,388
4 Sheets-Sheet 4
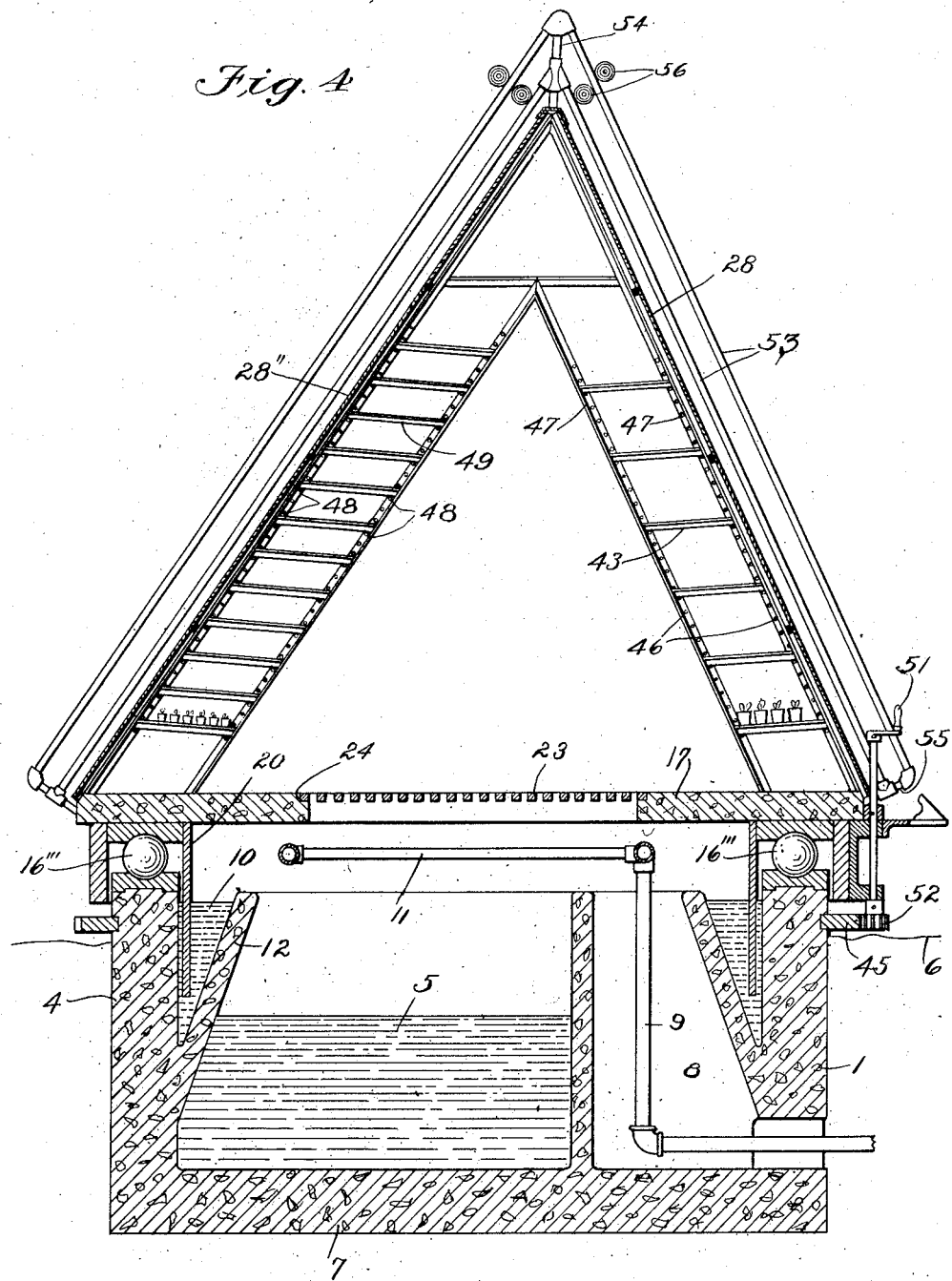
Inventor
Albert C. Burrage
by Roberts Cushman & Woodbury
Att'ys Patented Feb. 26, 1929.

1,703,388

UNITED STATES PATENT OFFICE.

ALBERT C. BURRAGE, OF BOSTON, MASSACHUSETTS.

METHOD FOR THE PRESENTATION OF MAXIMUM OF SUNLIGHT TO THE PLANTS IN GREENHOUSES.

Application filed November 12, 1926. Serial No. 147,936.

This invention relates to a method for the treatment of a given object (or a plurality of objects such as plants) with a prolonged exposure to the effects of sunlight, and to apparatus (such as a glass-enclosed greenhouse or the like) wherewith to effectuate the method in its practical applications.

Although the sun is at a distance of some 92,000,000 miles from the earth, that fraction of its radiant energy or sunlight which is intercepted by the earth's surface represents the main source of energy which is practically available to mankind either for the needs of industry or for the maintenance and propagation of life itself, or of the life processes. The natural conversion of the radiant energy of sunlight into a concentrated condition or form is exemplified on a large scale in the development and growth of plant life, which is thus primarily dependent upon sunlight, while animal life is dependent upon plant life and the practical utilization of energy in the arts is of course dependent upon both forms of life. Nevertheless, in the actual practice of the arts (and especially horticulture) this factor is frequently disregarded and only imperfectly provided for, so that the effective sunlight which reaches the plants in nearly all greenhouses is greatly reduced and is far less than the total amount which is actually available.

There are many contributing factors which lead to this result, among which a few of the more important may be cited for purposes of specific reference and consideration. Others will appear from a careful analysis of the conditions prevailing in any given locality.

A fundamental factor determining the available sunlight at any given part of the earth's surface is the latitude and the corresponding seasonal fluctuations in the annual total of daylight hours, and hence the maximum number of hours of sunlight which is possible. Thus, while points on the Equator have days and nights of equal length throughout the year, the Arctic polar regions have continuous day in the summer months and no daylight at all in the winter months. Intermediate points have longer days than nights during a part of the year and longer nights than days during the remainder of the year. Accordingly the total possible hours of daylight during the year at a given point vary with the latitude.

| | |
|---|---|
| Equator | 365×24/2=8760/2=4380 hours |
| New York | 4456 |
| Boston | 4469 |
| London | 4407 |

It will be noted that points remote from the Equator may receive more hours of daylight than at the Equator. The temperature differences of climate, however, may be attributed to the lesser intensity or quality of the sunlight which is received at such latitudes as compared to the direct rays at the Equator. Moreover, owing to local weather conditions such as cloudiness, rain, fog, smoke and the like, the actual number of hours of sunshine which are received annually at such latitudes average considerably less:—

| | Hours (approximately). |
|---|---|
| London | 1400 |
| Boston | 2493 |
| New York | 2510 |
| Philadelphia | 2575 |
| Los Angeles | 3219 |
| Phoenix, Arizona | 3742 |

Accordingly, this experience record of the actual hours of sunlight which are annually received at a given place is the real determining or limiting factor of all processes, such as those of plant life which depend either in whole or in part upon the sun's rays. Artificial light does not duplicate and hence can not replace sunlight either in quality or in quantity. Therefore the hours in each year during which such life process can function is positively fixed.

It therefore becomes essential for horticulturists in any given section (especially where the annual total of sunlight is low) to utilize to the very best advantage all of the available sunlight hours in the operation of their greenhouses and to effect such economies and efficiencies of the glass-enclosed spaces as may be practicable.

The annual available sunshine, however, is subject to various other fluctuations, with respect to quantity, quality and intensity of the sunlight received by the earth's surface. In other words, one hour of sunlight is not equivalent to every other hour of sunlight. In fact, during the seasonal variations of the earth's position with respect to the sun's rays, the quantity of sunlight falling upon a unit area in a given latitude of the earth's surfaces is constantly changing. Superposed upon this change is the fluctuation due to the apparent diurnal course of the sun with respect to any specific area or location in question. The latter influence is manifested by the daily horizontal arc through which the direct rays of the sun (with respect to a given spot) apparently move and also the continuously increasing and decreasing angle of elevation of such rays with respect to the earth's horizon.

These fluctuations are indicated by the following table (latitude approximately 42° N.):—

Horizontal arc of the apparent diurnal course of the sun

June 21_____ 226°
December 21_____ 138°
March 21 and September 21_____ 180°

Apparent elevation of the sun at noon, with respect to the horizontal

June 21 _____ 72°
December 21_____ 24° 18 min.
March 21 and September 21____ 47°

Accordingly, a glass-enclosed greenhouse receives the sunlight from progressive points along a horizontal arc of 226° during a single day on June 21 and along an arc of 138° on December 21, while the arc for each intervening day varies proportionately. Consequently the angle at which the sunlight impinges upon the glass roof of a greenhouse, varies in like manner. The angle also varies with the diurnal variation in the elevation of the sun's rays with respect to the horizontal from sunrise till noon and from noon till sunset.

It is well known that when light strikes a sheet of glass at low or acute angles, the light is in large part reflected. To such extent as this occurs, therefore, the light is not transmitted through the glass and hence does not reach the plants in the interior of the house. The proportionate amounts to which this reduction of light may reach will be apparent from the following table:

| Angle of glass surface to the light | Relative percentage of light transmitted at different angles (90° =100%) |
|---|---|
| 90° | 100% |
| 60° | 95% |
| 30° | 84% |
| 10° | 71% |

It is therefore manifest that during those hours of the day (for example in the early morning and late afternoon) when the light comes to the roof of the greenhouse at a low or acute angle, the effective or transmitted light is greatly reduced, by an amount which increases with its deviation from the perpendicular to the glass surface. Hence, since the light is initially less intense at these hours, the actual value of the effective light received within the house is exceedingly diminished.

To partially offset this loss of light many greenhouses are placed so that the main roof is presented to the south or slightly east of south. This affords some additional benefit from the noon day and morning sunlight by receiving it under better conditions for its greater effectiveness in the earlier part of the day rather than at or after noon time. But the early morning and afternoon sunlight are nevertheless still subjected to the reductions above noted.

Moreover, the frameworks which are at present generally employed in glass houses, such as rafters, supports, ventilators, purlins, and shelves, as well as various mechanisms which are incidental to greenhouse operation, cast shadows upon the contents of the house and these shadows, in effect, traverse substantially everything lying beneath or behind such obstructions in the course of the day. In this manner a given plant may be successively shaded by many different rafters during different parts of the day as well as by more substantial opaque objects, such as the opaque shelves and flower pots, and the other plants which may at some period stand between them and the direct rays of the sun.

When light passes from a medium of a given degree or rate of transmission, such as the air, to a medium of different degree or rate of transmission, such as glass, it is refracted, as is well known, and there is a loss of intensity which is due partly to dispersion and partly to absorption. Both of these losses are also greater when the angle of incidence is small or acute than when it approaches the perpendicular.

Another consideration of the factors tending to diminish the effective sunlight received by objects in a glass house, of the types heretofore used, is that any surface therein (including the surface of the glass roof) receives light to best advantage only when it stands perpendicular to the sun's rays, and this precise condition occurs, if at all, but momentarily each day. The consequent relative variations in intensity of the sunlight received by a fixed horizontal surface will be clear from the following data:

| Altitude of the sun | 0 | 5 | 10 | 20 | 30 | 40 | 50 | 60 | 70 | 80 | 90 |
|---|---|---|---|---|---|---|---|---|---|---|---|
| Intensity of radiation on a horizontal surface | 0.0 | .01 | .05 | .17 | .31 | .44 | .55 | .65 | .72 | .76 | .78 |
| Intensity of radiation on a surface normal to the sun's rays | 0.0 | .15 | .31 | .51 | .62 | .68 | .72 | .75 | .76 | .77 | .78 |

While the intensity of the early morning light (when the sun is at a low vertical altitude) is therefore initially of a very low value, it is nevertheless important that a large proportion of it should reach the plants. It has been found by experience that mildew may be caused by the cold dew which falls upon plants and flowers in the early morning hours, if it is not rapidly and more or less completely evaporated. Again, if the dew has collected in drops upon the plants and remains until the sun has risen to an appreciable height and its light is of strong intensity, these drops act as lenses and the light burns the surfaces under them as is well known. However, there is less opportunity for such evaporation to occur in a glass-enclosed greenhouse than when the plants are in the open and exposed to the early morning breezes or light currents of air. Hence it is essential that this deficiency of air be corrected by making available as much of the early sunlight as is possible for this purpose.

As a specific instance of the importance of variations in the quantities of sunlight which are available in different localities and the deficiencies in the present methods and apparatus for rendering the sunlight effective with respect to the plants grown in greenhouses and the like, the conditions encountered in the growing of orchids may be cited. The demand for this division of plants, which is one of the largest of the vegetable kingdom, is almost wholly for new hybrids. Although the orchid seed is not slow in germinating, the little seedlings are very slow in growing and usually do not outgrow, for example, a two and one-half inch flower pot in less than two and one-half years. They therefore require much sunlight and over a long period of time, beside heat and moisture, although they do not occupy a considerable amount of space nor is much ventilation necessary. Consequently, this demand can be satisfied by only a few individuals on account of the great amount of time, attention and expense which is required to grow such hybrids from the seed to blossoming plants.

Accordingly, it is an object of this invention to correct or overcome these disadvantages (which are inherent in the use of glass houses as heretofore constructed and employed) and to provide a method and means whereby objects such as plants may be afforded an efficient quantity and quality or intensity of the direct sunlight throughout all of the daylight hours and through the varying seasons of the year. It is also an object of the invention to decrease the total period of time which is required for a given result and thus to make possible or more efficient the cultivation of such plants in regions of the higher latitudes or regions of fewer available sunlight hours.

It is a further and more specific object of the invention to provide a method and apparatus adapted for providing the necessary and desirable conditions for the growth of plants in an efficient, inexpensive and practicable way. To this end it is my special purpose to provide a means of presenting seedlings, such as orchids or other slow-growing plants, directly to every ray of sunlight from the beginning of the year to the end. Other objects will appear from the following disclosure and from the claims.

The method of the invention in general terms, comprehends enclosing the objects or plants within an enclosure or container (having walls which are preferably transparent and of low light absorption such as a greenhouse), positioning the transparent surface in predetermined relationship to the sun's rays, and continuously or periodically turning the object or the container (or glass house) in substantial or periodical synchronism with the varying direction of the sunlight throughout the apparent diurnal (and seasonal) course of the sun with respect to the container. The turning movement may be a rotating or a revolving movement, as circumstances require, and will serve to accomplish the desired result, although rotation is in many respects to be preferred.

Means for the accomplishment of the method may consist generally of a permanent or fixed base and a transparent container (such as a glass house or greenhouse) and means for mounting the container thereon to permit of turning the same through the requisite amplitudes of arc which may be necessary. Means also are preferably provided for determining and regulating the precise angular disposition of the house and of the sun or the relationship between the two at any given time.

A specific application of the invention will be described with reference to its application for the germination, development and growth of orchids, which is especially typical and representative of the various conditions, qualifications, and results for which the invention may be adapted in practice.

The growth of orchids (as indicated by the natural environments of the almost innumerable species which compose this order of plant life) involves extremely diverse conditions of weather and of sunlight. Most orchids grow in the tropics, in their wild and uncultivated state and are found in the sultry, humid atmosphere of swamps and in the dense shady forest growths, upon the trees in the open edges of the woods, in protected valleys, in the mountains, upon sea-washed cliffs, and at substantially all intermediate stages of local and seasonal climatic conditions. Hence, to properly propagate and cultivate any large number of varieties of orchids in one locality, it becomes manifestly essential that this wide range of conditions must be, in large part at least, reproduced. To this end the requirements of heat, moisture, and fresh air are readily supplied, even in northern latitudes, by artificial means. But the multifarious conditions of light and shade and of the quality of the sunlight during the different parts of the day and at different angles of presentation which obtain in the natural environment of the wild orchid have been attempted only in minor details.

The practical adaptation of the invention will be described with respect to the growing of young orchids in greenhouses, (as representative of its application in general and not by way of limitation) reference being had to the accompanying drawings, in which:

Fig. 3 is an elevation of a modified form of the greenhouse shown in Fig. 1; and Fig. 4 is of a further modification.

Figure 1:
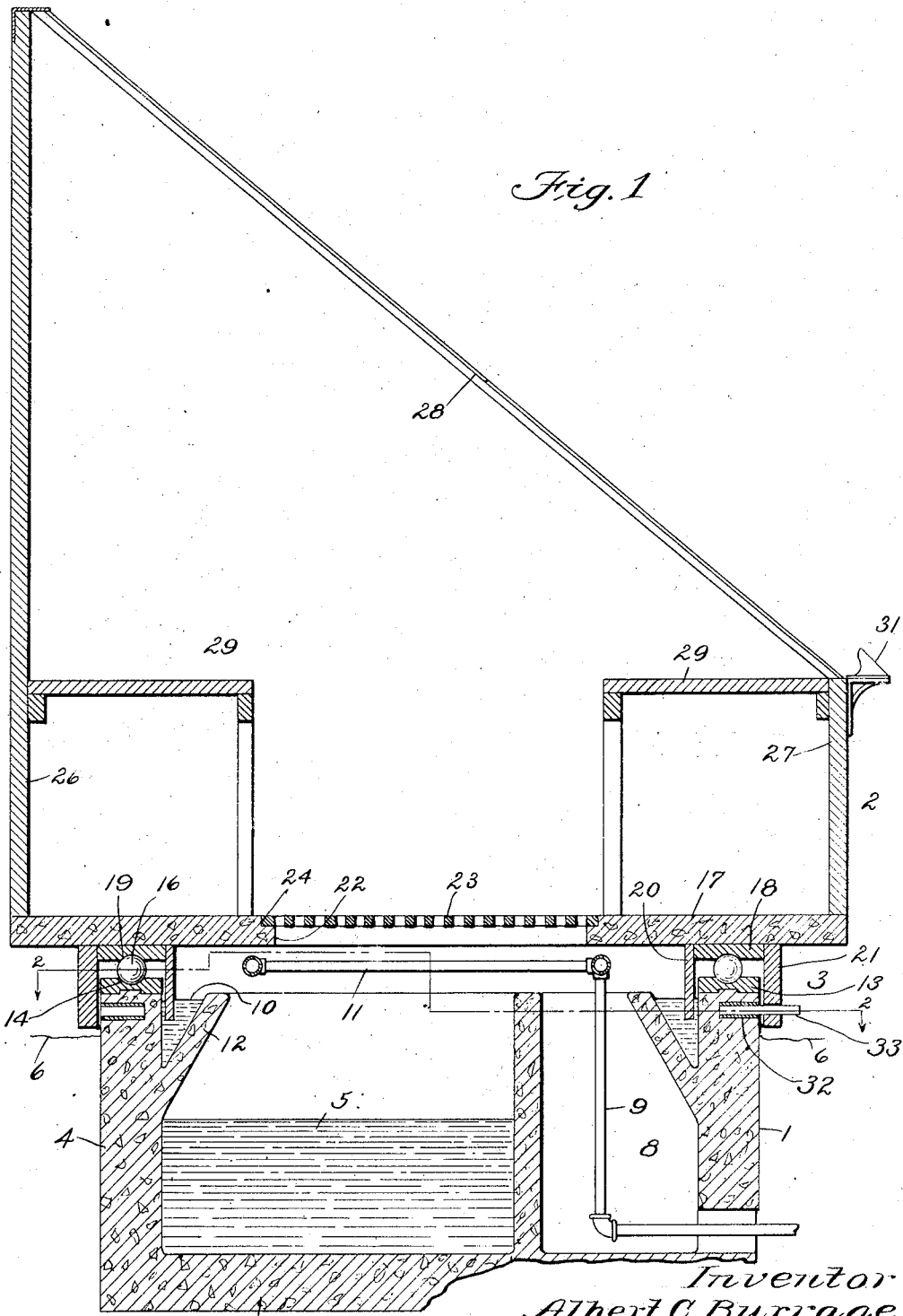
Fig. 1 is an elevation and cross section of a greenhouse constructed and arranged in accordance with the invention.

In the drawings number 1 indicates the permanent base upon which is mounted the superstructure of greenhouse 2, with means 3 for permitting the greenhouse to be rotated or revolved upon the base to substantially any required direction.

The base 1 includes a substantially circular wall 4 which may be set below the surface of the earth 6, and is enclosed at the bottom by a floor 7. The well thus formed may be partly filled with rain or other water 5 to keep the atmosphere in moist condition but a space 8 is separated and walled off at one side to receive heating pipes 9, leading to the coil 11, and like apparatus connected with the operation of the greenhouse.

On the inner top edge of the wall 4 is provided an annular gutter or trough 12 adapted to receive water or other liquid 10 therein for purposes later to be described. Around the top surface of the wall is provided a ball race 13 (which may be composed of a circular plate or plates and made of metal or wood) having an annular groove 14 in the middle thereof to receive ball bearings 16, or conical bearings, or other suitable equivalent.

The greenhouse 2 may be of the usual lean-to or other construction comprising a revolving support or platform such as the reinforced floor 17 carried upon a circular ball race 18 on its under side, more or less symmetrically disposed with respect to the volume and weight of the house, and adapted to rest upon the ball bearings 16 lying in the groove of the lower ball race and fitting into groove 19 of the upper race. Inside of the ball race 18 is provided an annular depending flange 20 of such diameter as to clear the lower ball race and of sufficient depth to extend downward into the liquid 10 contained in annular gutter or trough 12. Outside of the ball race 18 is provided a second annular flange 21 overhanging the outer edge of ball race 13, and of sufficient diameter to clear the ball race and foundation wall but extending slightly below the aperture due to the ball-bearing construction.

An opening 22 is provided through the floor 17 covered by a grid 23, positioned in recesses 24 to permit ready access to the well 1 or manhole 8.

The upper portion of the structure 2, as shown, comprises vertical side walls 26, 27, a lean-to style of roof 28 and benches 29 of the type now usually used. Other construction and fixtures for specific purposes may be added as required.

On the outside of the house and conveniently attached in predetermined fixed relationship to the sunny aspect of the greenhouse roof there is provided a style 31. As shown, the style projects perpendicularly to the sunny wall of the house.

Along the outer margin of the circular foundation wall 4 are provided a series of openings or pipes 32. These may be closely and evenly spaced or they may be spaced at predetermined intervals in the circumference of the wall attached to the greenhouse proper. Positioned in such manner as to register with the series of openings 32 there is provided a pin 33, associated with the upper portion and adapted to be inserted into an opening 32, opposite to it and thus to lock the greenhouse 2 to the base 1 against rotation or other relative movement.

Figure 2:
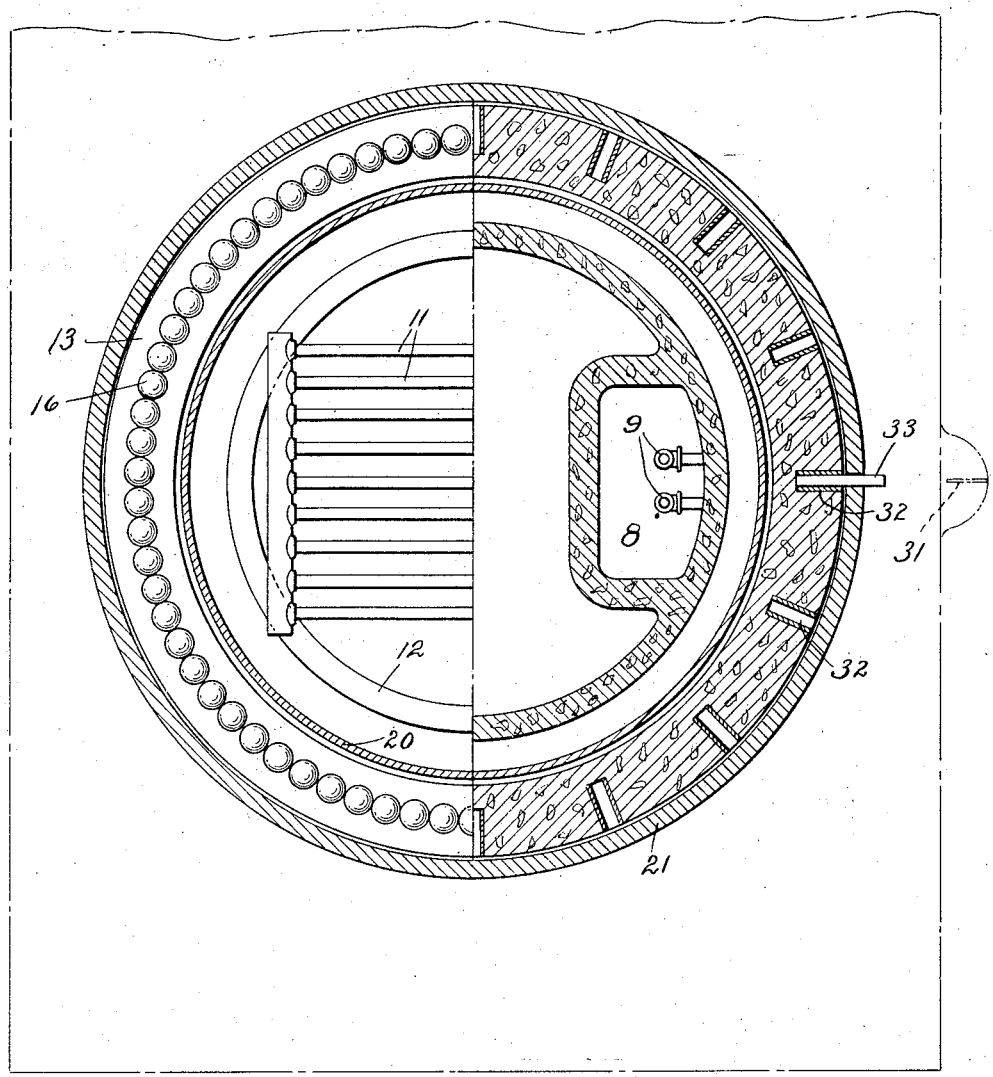
Fig. 2 is a plan view along the line 2—2 of Fig. 1.

A modification of the structure which may for certain purposes be especially adapted, as in the cultivation of orchid seedlings, is illustrated in Fig. 3 in which like numerals indicate corresponding parts. The supporting base 1 is here provided with a central shaft 40 having a collar 41 adapted to receive the central portion of a spider wheel or brace 42, the arms of which extend upwardly and are fastened to the under side of the floor 17. This serves to restrain the house from movement in any transverse direction due to wind pressure and the like. The ball bearings shown in Figs. 1 and 2 are replaced by frusto conical roller bearings 16' mounted in the annular spacer 16''. The upper structure 2 of the greenhouse in this modification is shown as a two-span roof, instead of as a lean-to and characterized by sloping roofs 28' forming a wide angle with the horizontal, and adjustable, inwardly sloping shelves 43 on the inner side of each roof so constructed and arranged as to receive a maximum of sunlight through the roof and effectively upon the plants 44 which are carried by the shelves, as more fully described and illustrated in my copending application Serial No. 147,935, filed November 12, 1926. In this type of greenhouse the transparent roof on the sunny side of the house is preferably given such an angle with the horizontal as to stand perpendicular to an average diurnal or seasonal elevation of the sun's rays.

The operation of the greenhouse will now be clear. The benches are stored with flower pots containing the orchid seedlings in the usual manner, or as more efficiently arranged by the adaptation of the features indicated in Fig. 3 and the customary attention provided for, such as watering, ventilation and the like. The pin 33 is now withdrawn and the house manually rotated upon the ball bearing base until the style 31 casts no shadow. If it be in the early morning, the light will be of relatively weak intensity and the full application is desirable. The pin 33 is then dropped into the nearest opening 32 which retains it in this position, as against the force of the wind or casual shocks to which the house may be subjected. In a short while, the sun having progressed appreciably in its apparent course from east to west, the pin 33 is again removed, the house rotated and the pin again dropped into one of the openings 32 corresponding to its new position. This operation is continued at suitably frequent intervals throughout the day, thus bringing the perpendicular aspect of the greenhouse roof substantially continuously directed toward the sun. At noon time, if the light intensities should be too great, the greenhouse may then be rotated to one side or the other or may be rotated through 180° for a short period, thus bringing the contents of the house into the shadow of the back wall 26. Later it is swung around into its sunny position, and rotation continued with the angular variations of the sunlight throughout the remainder of the day, controlled to effect the angular rate of rotation desired.

In this manner not only is all of the sunlight (at any given latitude) made available for application to the contents of the greenhouse, but any variation in quality or duration of sunlight is readily obtainable, limited only by the prevailing weather conditions, which are at present beyond human control.

Moreover, throughout the day the shadows of the rafters, etc., fall the same, or at a predetermined fixed position, in relationship to the plants, so that if the plant is once placed in the sunlight it is maintained in the sunlight continuously. Again, on account of the adjustable spacing of the shelves and the wide angle at which the series of shelves is arranged with respect to the horizontal, as well as the transparency of the glass shelves, also, all of the plants on each shelf receive direct sunlight. The sunlight coming through the upper part of the roof strikes down through the plants on the shady side of the house.

With the two-span roof, the plants on each side may be given alternate treatment, as by swinging the greenhouse through 180° occasionally, the regular rotatory movement being regulated as already described.

In further modification of the invention, in accordance with the construction shown in Fig. 4 (and which in certain respects is more fully described in the co-pending application already alluded to) the base 1 is provided with a deeper annular trough 12 and a correspondingly deeper flange 20 depending therein. It is also provided on its outer periphery with an annular rack 45. The superstructure 2 is similar in some respects to that shown in Fig. 3, but the roofs 28'', 28'' extend to and are braced by butting against the floor 17, while the shelves 43 not only incline inwardly sufficient to permit water to drain freely therefrom but are also independently adjustable by means of the series of holes 46, 46, in the rafters 47, 47, respectively, pins 48 fitting therein and supporting brackets 49 adapted to rest thereon. Affixed to the superstructure 2 there is also provided a hand wheel 51 with gear 52 adapted to engage the rack 45 already mentioned. Thus, by turning the hand wheel, the superstructure may be rotated freely and easily upon the base 1, while being supported upon the large ball bearings 16''.

The roofs 28'' may also be provided with sloping rods or pipes 53 attached to vertical uprights 54 at the ridge pole and uprights 55 at the lower edge. These serve to support roller curtains 56, so that they may be lowered or raised at will.

The operation of this type of house will be substantially the same as with those already described except that it may be somewhat more easily effected and ordinarily it will not be necessary to lock it in position, though the handle may be tied if wind pressure or the like requires it.

It will be apparent that the movement of the house may be automatically effected either continuously, as by suitably geared clockwork, or by intermittently operated driving mechanisms of well known constructions and modes of operation. Hand operation is, however, sufficiently simple and accurate for most purposes and at some seasons of the year when special conditions require consideration it may be preferable.

The house may be heated by a hot water or steam coil 11 while moisture is supplied from the body of water contained in the well. The annular flange 20, by dipping into the water contained in trough 12, and flange 21, form a seal against the entrance of air from the outer atmosphere or the loss of moisture and heat from the interior of the greenhouse.

As a modification of the method of the invention, in addition to the horizontal angular movement of the greenhouse as thus provided, it may be desirable to impart a vertical angular movement thereto, to correspond to the elevation and declination of the sun from sunrise till noon and from noon until sunset, respectively. Such vertical movement may be provided for, as by pivotally mounting the roof or body of the house with respect to the floor so that its angular disposition with respect to the horizontal also may be suitably varied during the day, to correspond, for example, to the varying elevation of the sun.

In the manner described the contents of the greenhouse are presented substantially to a maximum proportion of the sunlight which is available (or which is desirable for the purpose in question) and also for a maximum period each day.

As above stated, deviations from such practicable maxima may be desirable and may be effected with respect to the initial sunlight as already described, but other variations and qualifications may be provided by interposing shade of different kinds and degrees as by lattice work blinds, transparent walls, such as glass, translucent sheets, such as cloth, different colors of transparent, translucent, or reflective media, and various other combinations and conditions may be resorted to for the modification and control of the nature and intensity of the effective sunlight brought to bear upon the plants under treatment. It follows as a consequence that all degrees and kinds of sunlight treatment may be effected, in accordance with this invention, limited only to the initially limited intensity of the sunlight due to latitude and by the fluctuating number of actual daylight hours during the seasons of the year.

It is to be understood that many adaptations and modifications of the invention and apparatus as here described may and normally will be resorted to in the practical application thereof in the several arts to which it is inherently related, but such adaptations and modifications are considered to be comprehended and included by the above disclosure and as being within the terms of the following claim.

I claim:

A method for effectuating the continued treatment of plants with sunlight, which comprises enclosing the same within a substantially transparent container and rotating the container about a vertical axis in a predetermined angular synchronism with respect to the diurnal course of the sun's rays.

Signed by me at Boston, Massachusetts, this 8th day of November, 1926.

ALBERT C. BURRAGE.